United States Patent
Ortiz, Jr. et al.

[11] Patent Number: 5,837,367
[45] Date of Patent: Nov. 17, 1998

[54] MEMORY CARD AND METHOD OF PRODUCING SAME

[75] Inventors: Fernando Ortiz, Jr., Sao Paulo, Brazil; James T. Faris, Stanley, N.C.

[73] Assignee: Interprint Formularios Ltda., Sao Paulo, Brazil

[21] Appl. No.: 637,762

[22] PCT Filed: Jan. 27, 1995

[86] PCT No.: PCT/BR95/00006

§ 371 Date: May 1, 1996

§ 102(e) Date: May 1, 1996

[87] PCT Pub. No.: WO96/23277

PCT Pub. Date: Aug. 1, 1996

[51] Int. Cl.⁶ ............................................ G11B 5/66
[52] U.S. Cl. .................... 428/332; 428/336; 428/480; 428/694 R; 428/694 T; 428/694 TS; 428/694 TR; 428/67; 428/137; 428/138; 428/900; 427/127; 427/131; 427/132; 361/748; 361/749; 361/750; 361/751; 283/83; 204/192.2
[58] Field of Search ..................... 428/332, 336, 428/480, 694 T, 694 TS, 694 TP, 694 R, 67, 137, 138; 361/748, 750, 749, 751, 414; 283/83; 427/127, 131, 132; 204/192.2

[56] References Cited

U.S. PATENT DOCUMENTS

| | | | |
|---|---|---|---|
| 3,616,406 | 10/1971 | Turner | 204/192.12 |
| 3,627,662 | 12/1971 | Feuersanger | 204/192.25 |
| 4,719,140 | 1/1988 | Hara et al. | 428/138 |
| 4,737,620 | 4/1988 | Mollet et al. | 235/492 |
| 4,756,795 | 7/1988 | Bakos et al. | 216/18 |
| 4,929,320 | 5/1990 | Yamada et al. | 204/192.2 |
| 5,063,120 | 11/1991 | Edmonson et al. | 428/694 BU |
| 5,260,254 | 11/1993 | Hotta et al. | 503/217 |
| 5,264,689 | 11/1993 | Maes et al. | 235/492 |
| 5,272,536 | 12/1993 | Honore | 301/633 |
| 5,272,596 | 12/1993 | Honore et al. | 361/633 |
| 5,320,769 | 6/1994 | Kinoshita et al. | 252/62.54 |

FOREIGN PATENT DOCUMENTS

| | | |
|---|---|---|
| 9105585A | 6/1993 | Brazil . |
| 9201380 | 10/1993 | Brazil . |
| 0 349 412 A1 | 1/1990 | European Pat. Off. . |
| 0 350 078 A1 | 1/1990 | European Pat. Off. . |
| 0 440 814 A1 | 6/1993 | European Pat. Off. . |

*Primary Examiner*—Leszek Kiliman
*Attorney, Agent, or Firm*—Bell Seltzer Intellectual Property Law Group of Alston & Bird LLP

[57] ABSTRACT

The invention relates to a memory card and its method of manufacture. The memory card has a flexible composite substrate formed from a top film, a base film, and an adhesive layer deposited between and bonding together the base film and the top film. Preferably, the thickness of such composite substrate is between 8 and 12 mils. A layer of metal is adhered to the exposed surface of the top film. A circuit layer is provided to form at least one site on the memory card which is readable by an external reading device. A protective layer is provided to overlie and protect the circuit layer of the memory card.

19 Claims, 2 Drawing Sheets

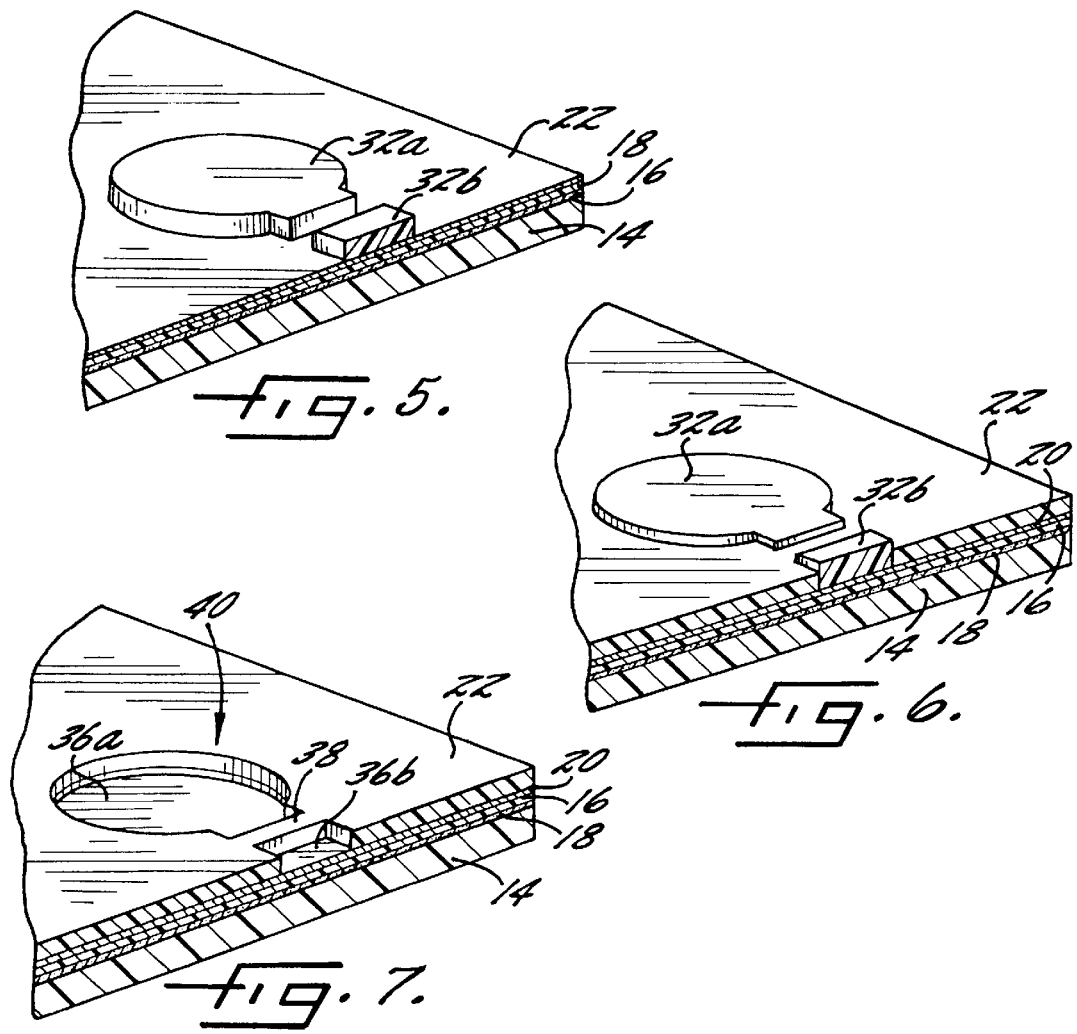
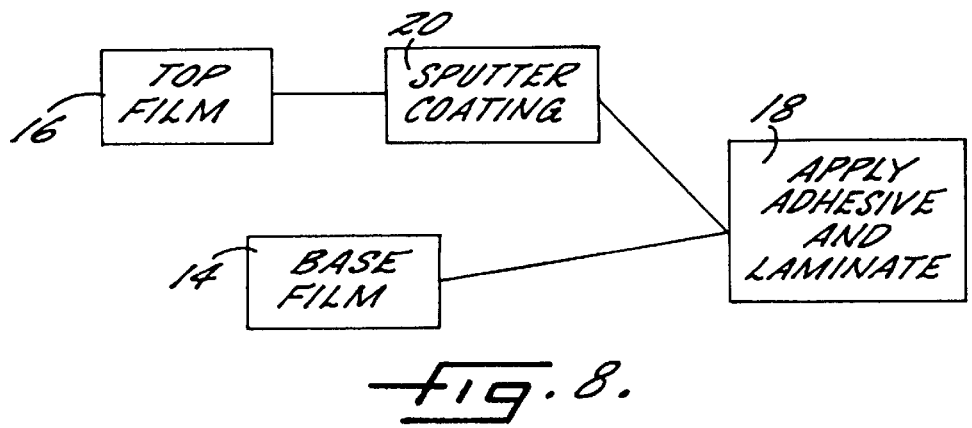

MEMORY CARD AND METHOD OF PRODUCING SAME

FIELD OF THE INVENTION

This invention relates to memory cards of the type used as prepaid cards for dispensing goods and/or services, and to an improved method for producing such cards.

BACKGROUND OF THE INVENTION

Prepaid memory cards which enable their owner to perform purchases without the use of cash or tokens have become very popular. Typically, such cards have been used to obtain a variety of goods and/or services, as for example, in vending machines for beverages or food, in prepayment of public transportation such as buses, trains or subways, or for use with public telephones or photocopy machines.

Typically, the memory cards are one of several types: magnetically readable cards, microcircuit cards, and contactless cards. Magnetically readable cards have a magnetic stripe located on the outer surface where information, such as remaining value of the card, is stored. They have the advantage of being relatively inexpensive, and have been used successfully, for example, as fare cards for transit systems. However, this type of card is of limited usefulness as a prepaid card for security reasons. The magnetically encoded information stored on the cards is capable of being accidentally erased or intentionally altered by unauthorized persons to increase the units originally contained on the memory card.

Microcircuit cards have a memory device such as an integrated circuit or printed circuit embedded into the card which, through suitable electrical contacts, can be connected to an external reader for determining the remaining value of the card. Examples of such microcircuit cards may be seen in U.S. Pat. Nos. 4,737,620 to Mollet et al. and 4,719,140 to Hara et al. Although much more resistant to tampering than, magnetically readable cards, microcircuit cards have the disadvantage of being relatively expensive. Therefore, they are not well suited to be used for denominations of relatively small monetary value.

Contactless cards do not have any contacts for physically making connection to an external reader device. Instead, contactless cards utilize means such as inductive and/or capacitive coupling for providing an external reader device with signals indicative of the monetary value of the card. Examples of contactless cards may be seen in U.S. Pat. No. 5,272,596 to Honore et al. and Brazilian Patent Specifications PI 9105585 and PI 9201380.

Typically, memory cards are intended to be used only until the prepaid monetary value of the card has been exhausted. Once this monetary amount has been spent by the user, the card is either recycled or thrown away. For instance, when used with public telephones, the memory card is purchased for a predetermined monetary value which is stored in the card and the monetary value is decremented as and when the card is used.

With all types of prepaid memory cards, the cost of the card is a limiting factor in determining the practical uses or applications for prepaid memory cards. Typically, the use of prepaid memory cards is practical only where the total monetary value represented by the card exceeds the cost of the card itself. Thus, if the cost of the card can be reduced, this opens the possibility for issuing smaller denomination (lower total monetary value) cards in the many existing applications where prepaid cards are presently used, and also expands the number of potential applications or uses where prepaid memory cards could be used.

However, manufacturers are faced with a very significant challenge in reducing manufacturing costs without undesirable sacrifice in the overall quality, reliability and durability of the memory card. The nature of the materials and manufacturing techniques currently being used can result in stiff or brittle memory cards. Consequently, bending of the memory card during typical use may cause damage to or destruction of portions of the memory card.

SUMMARY OF THE INVENTION

With the foregoing in mind, it is an object of the present invention to produce a memory card at reduced overall cost.

It is a further object of the present invention to provide an improved, reduced cost memory card having good reliability and durability.

These and other objects, features, and advantages of the present invention are obtained by providing a memory card having a flexible composite substrate formed from a top film, a base film, and an adhesive layer deposited between and bonding together the base film and the top film. Preferably, the thickness of such composite substrate is between 9 and 14 mils. A layer of metal is adhered to the exposed surface of the top film. Preferably, the metal layer is a sputter coated nickel layer having a surface conductivity of about 20 ohms per square. A circuit layer overlies the metal layer to form at least one site on the memory card which is readable by an external reading device. In addition, a protective layer overlies and protects the circuit layer of the memory card. Printed indicia may also be provided on the front and/or back of the memory card to enhance the attractiveness of the memory card and provides instructions for use of the memory card. Preferably, both the base film and the top film are made from a flexible thermoplastic polymer such as a biaxially oriented polyethylene terephthalate. Preferably, the top film is thinner than the base film. The top film has a thickness of about 1 to 2 mils and the base film has a thickness of about 8 to 12 mils.

The composite laminated substrate and the selection of film thickness provides a memory card with excellent durability and reliability. Moreover, the card has greatly improved flexibility, enabling the memory card to be bent almost 180° in each direction during use and/or storage by the owner, without damaging or destroying the memory. As a result, the memory card can withstand greater abuse and still perform its intended function until its monetary value has been exhausted.

In a preferred embodiment of the invention, the circuit layer of the memory card is designed to provide for storing a predetermined number of "units" of some preassigned value, and for incrementally and permanently decrementing the number of units as the memory card is used and the units of value are "spent." Preferably, the memory card has a plurality of spaced apart sites or cells which are adapted to be read by an external reading device. It is desirable that each site of the circuit layer be capable of being irreversibly converted from a first readable state to a second readable state. This ability to irreversibly convert each site enables the memory card to be decremented as and when it is used in a secure, tamper-proof manner.

The layer of metal which is adhered to the exposed surface of the top film is preferably a layer of nickel having a thickness of less than 0.5 microns and more desirably about 0.2 microns. It is preferable for improved readability of the cells of the contactless memory card, that the nickel layer have a surface conductivity of about 20 ohms per square. Preferably in accordance with the invention, the nickel layer is formed by sputter coating onto the top film. This technique provides a very uniform and reproducible metal coating layer which provides significant quality advantages over other metal deposition methods.

The above described memory card is preferably manufactured by an efficient low cost method which enables the memory card to be used in a wide variety of applications while maintaining its high quality. A preferred method of manufacturing the memory card includes applying a thin layer of conductive metal to one surface of a polyester film, then laminating the opposite surface of the film by an adhesive to a thicker polyester film to form a flexible substrate. A circuit layer is formed on the substrate by a thin layer of conductive metal with a melting point equal to tin/lead (40%/60%) alloy. The circuit layer includes a plurality of spaced apart sites or cells which are capable of being read by an external contactless reading device. A protective sealant layer is then applied over the conductive layer to protect the credit cells.

BRIEF DESCRIPTION OF THE DRAWINGS

FIG. 5 is a view similar to that shown in FIG. 4 illustrating the memory card's appearance after removal of unexposed areas from the substrate;

FIG. 6 is a view similar to that shown in FIG. 4 illustrating the memory card's appearance after electrochemical deposition of the second coating;

FIG. 7 is a view similar to that shown in FIG. 6 illustrating the memory card's appearance after removal of exposed areas from the film; and FIG. 8 is a flow diagram illustrating the method steps used to manufacture the substrate of the memory card in accordance with the present invention.

DETAILED DESCRIPTION OF THE PREFERRED EMBODIMENTS

The present invention will be described more fully hereinafter with reference to the accompanying drawings, in which preferred embodiments of the invention are shown. This invention may, however, be embodied in many different forms and should not be construed as being limited to the specific embodiments set forth herein; rather, these embodiments are provided so that this disclosure will be thorough and complete, and will fully convey the scope of the invention to those skilled in the art. Like numbers refer to like elements throughout.

Figure 1:
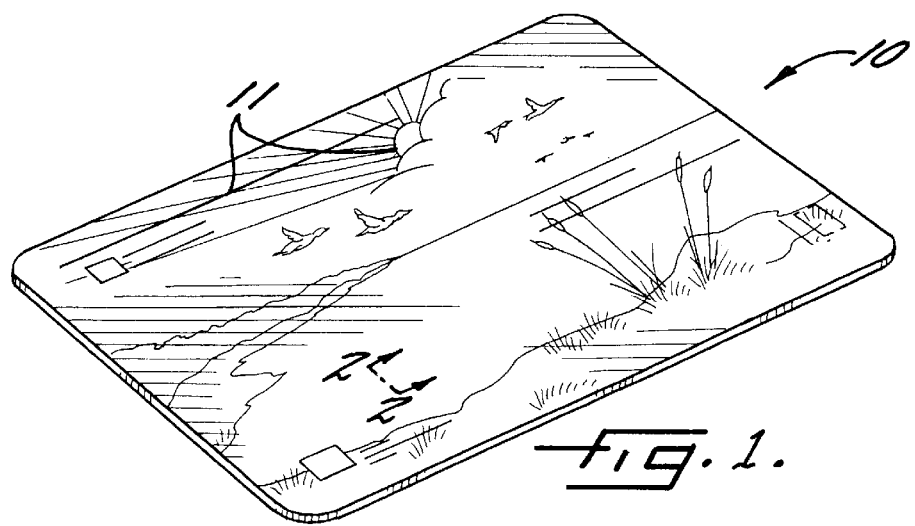
FIG. 1 is a perspective view of a memory card in accordance with the present invention.

According to the illustrated embodiment, a flexible contactless memory card 10 is provided for use with a reader device similar to that disclosed in Brazilian Patent Specification No. PI 9201380, which is incorporated herein by reference. As shown in FIG. 1, the memory card 10 is of a generally rectangular configuration with rounded corners. The memory card 10 has an overall dimension of approximately 8.5 cm (3.5 inches) by 5.25 cm (2.25 inches) and a thickness of approximately 12 to 16 mils. The front and/or back surface of the memory card 10 may bear printed indicia in the form of text and/or designs as indicated at 11.

Figure 2:
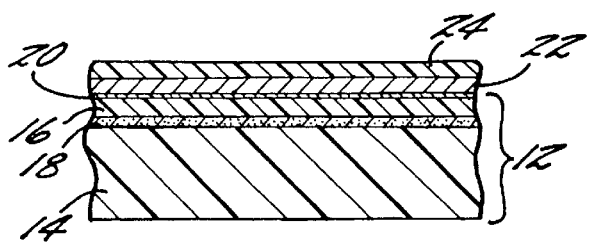
FIG. 2 is a cross-sectional view of the card taken along line 2—2 of FIG. 1.

As shown best in FIG. 2, the memory card 10 is formed from a substrate 12, which includes a base film 14 and a top film 16 laminated together by an adhesive layer 18. A thin layer 20 of a relatively high magnetic conductive metal, preferably nickel, is applied to the exposed surface of the top film 16. A layer 22 of a lower melting point metal, such as tin/lead, is then applied to the nickel layer 20. The tin/lead layer forms a circuit layer as described in more detail below. A protective layer 24 overlies and protects the tin/lead layer 22 and provides an abrasion resistant front surface for the card. The protective layer may be formed of a suitable composition, such as an epoxy resin. The protective layer 24 may also bear printed (offset/litho) indicia 11, shown in FIG. 1, to enhance the attractiveness of the memory card 10 and provide necessary instructions for its use.

The base film 14 and the top film 16, of this embodiment are made from a durable, flexible polymer film. Particularly suitable for use in forming the substrate are polyester films, a commercially available example such as PACUR from Rexham Industries Corp. The base film 14 preferably has a thickness of about 10 mils. The top film 16 preferably has a thickness of only about 2 mils.

Figure 3:
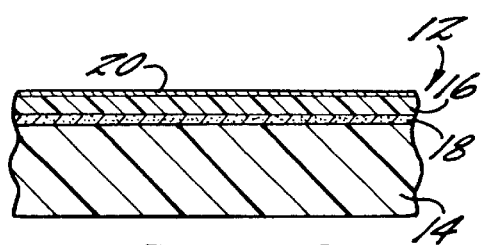
FIG. 3 is a cross-sectional view of the substrate used in forming the memory card shown in FIGS. 1 and 2.

The substrate 12 may be produced in the manner schematically shown in FIG. 8. A nickel layer 20 is deposited on one surface of the top film 16 by sputter coating. The sputter coated nickel layer 20 is preferably less than 1.0 microns in thickness, most desirably about 0.2 microns thick to provide a surface resistivity of about 20 ohms per square. The base film 14 and the top film 16 are then adhesively bonded together to form a composite structure. A suitable adhesive, such as a solvent-based polyurethane adhesive, is applied to the surface of the top film 16 opposite the nickel layer 20, or to one surface of the base film 14, or to both the top film and the base film. The adhesive-coated films are combined in a laminator, where heat and pressure is applied to cause the adhesive to firmly bond the film layers together. The resultant laminate substrate 12 is collected on a reel, and subsequently cut into sheets. A cross-section of the substrate 12 is best shown in FIG. 3.

Figure 4:
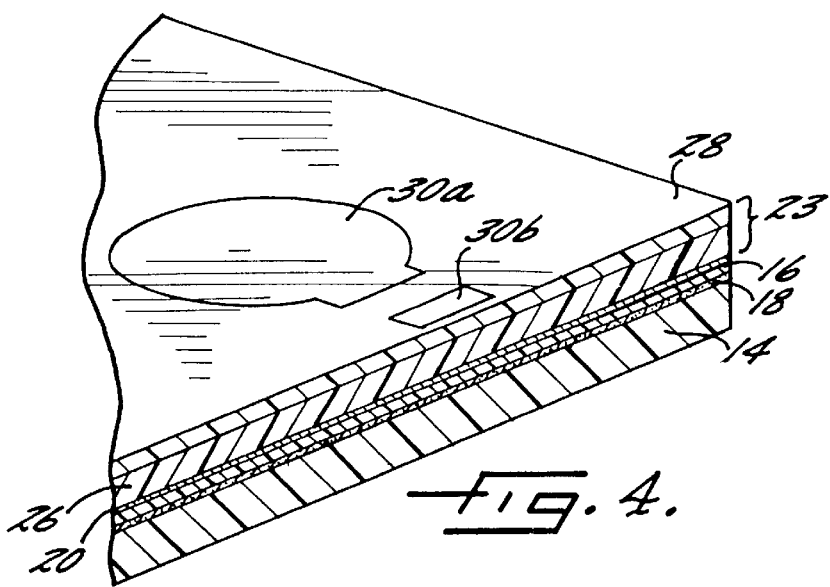
FIG. 4 is a perspective view, partially in cross-section, of the memory card illustrating how the substrate is masked and sensitized in producing the circuit layer.

FIGS. 4–7 illustrate one suitable method for making the circuit layer 23, as described in Brazilian Patent Specification No. PI 9,201,380. As shown in FIG. 4, a photosensitive layer 26 is applied to the nickel layer 20. A negative film or mask 28 containing transparent regions 30a and 30b of a predetermined desired pattern is then positioned over the photosensitive film 26 and the assembly is exposed to ultraviolet light to cause the photosensitive layer 26 to polymerize in the regions exposed to ultraviolet light through the transparent regions 30a and 30b of mask 28. The nonpolymerized regions of the photosensitive layer 26 are then developed, resulting in the structure shown in FIG. 5. The remaining polymerized regions form islands 32a and 32b which adhere to the nickel layer 22.

As shown in FIG. 6, a layer 22 of tin/lead is applied to the nickel layer 20, with the island regions 32a and 32b acting as masks preventing the tin/lead layer from adhering in those regions. In this embodiment, the tin/lead layer 22 is applied by an electrochemical bath wherein the memory card is the cathode and the electrolyte is the anode. In this instance, the electrolyte is a tin/lead salt solution in a ratio of approximately 60% tin and 40% lead so that the deposited tin/lead layer 22 has an almost eutectic composition. A low intensity current, in the range of 1 to 1.5 amperes per square decimeter is used so as to deposit the tin/lead layer 22 with a thickness of about 4 to 8 microns.

After the electrolytic deposition of the tin/lead layer 22, the island regions 32a and 32b are removed by chemical stripping solution means to expose areas 36a and 36b as shown in FIG. 7. The resulting structure forms a readable cell or site 40 with a fusible link 38. Although only one such cell 40 is shown, it will be understood that the card will have a plurality of such cells, typically and precisely arranged in columns and rows. A protective layer 24 is then applied so as to overlie and seal the circuit layer. As shown in FIG. 1, the protective layer 24 includes printed indicia 11 which is applied by suitable printing techniques, such as offset printing or silk screen printing, to the front surface of the protective layer 24 and optionally also to the exposed surface of the base film 14. The individual memory cards 10 are then cut to the ISO standard shape and tested.

It is to be understood that the nickel layer 20 may be made from conductive materials other than nickel, for instance, conductive polymers may be used in the substrate. In addition, another conductive material may be substituted for the tin/lead in layer 22 so long as the differences in conductivity and melting points between the first and second layers are maintained.

The memory card 10, manufactured by the above-described method, is inserted into an external inductive reader device, such as that described in Brazilian Patent Specification No. PI 9210380, which locates the respective cells 40 in the card. The cells are initially in a first, non-decremented state in which the fusible link 38 is intact. In order to decrement the card by one unit of value, the fusible link 38 can be fused and broken. The reader device accomplishes this by inducing a current into the cell 40, which concentrates at the fusible link 38, causing the link to melt. The cell 40 is thus irreversibly converted to a second readable state.

The reader device can detect the difference between a cell 40 in the first readable state and one in the second readable state. In this manner, the reader device can determine the number of cells in the first readable state, to thus ascertain the number of monetary units of value remaining on the card. When a monetary unit of value is "spent", the reader device causes a cell to be converted to the second readable state by fusing the fusible link. The memory card 10 is usable until all its cells have been decremented in the above-described fashion.

Many modifications and other embodiments of the invention will come to mind in one skilled in the art to which this invention pertains having the benefit of the teachings presented in the foregoing descriptions and the associated drawings. Therefore, it is to be understood that the invention is not to be limited to the specific embodiments disclosed. Although specific terms are employed, they are used in a generic and descriptive sense only and not for purposes of limitation, and that modifications and embodiments are intended to be included within the scope of the appended claims.

That which is claimed:

1. A memory card comprising:
   a flexible composite substrate having a thickness of approximately 9 to 14 mils, said composite substrate comprising a flexible thermoplastic polymer base film, a flexible thermoplastic polymer top film laminated one surface of said base film, and an adhesive layer disposed between and bonding together said base film and said top film,
   a layer of a magnetic metal adhered to the exposed surface of said top film,
   a circuit layer overlying said metal layer and forming at least one site on the card which is readable by an external reading device, and
   a protective layer overlying and protecting said circuit layer.

2. A card as set forth in claim 1 additionally including a layer of printing visible on the front of the card.

3. A card as set forth in claim 1 wherein said base film and said top film each comprise a polyester film, and said base film is thicker than said top film.

4. A card as set forth in claim 3 wherein said top film is a biaxially oriented polyethylene terephthalate film having a thickness of about 1 to 2 mils.

5. A card as set forth in claim 4 wherein said base film is a biaxially oriented polyethylene terephthalate film having a thickness of about 8 to 12 mils.

6. A card as set forth in claim 1 wherein said metal layer is a layer of nickel less than 0.5 microns in thickness.

7. A card as set forth in claim 1 wherein said metal layer is a sputter coated nickel layer having a surface conductivity of about 20 ohms per square.

8. A card as set forth in claim 1 wherein said circuit layer comprises a plurality of spaced apart sites adapted to be read by an external reading device, each site including means capable of being irreversibly converted from a first readable state to a second readable state.

9. A memory card comprising:
   a flexible composite substrate having a thickness of approximately 9 to 14 mils, said composite substrate comprising a flexible polyester base film, a flexible polyester top film laminated to one surface of said base film, said top film having a thickness of about 1 to 2 mils, an adhesive disposed between and bonding together said base film and said top film,
   a layer of metal having a thickness of less than 0.5 micron adhered to the exposed surface of said top film,
   a circuit layer overlying said metal layer, said circuit layer including a plurality of spaced apart sites adapted to be read by an external reading device, each site including means capable of being irreversibly converted from a first readable state to a second readable state, and
   a protective layer overlying said circuit layer and visible on the front of the card.

10. A card as set forth in claim 9 wherein said base film is a biaxially oriented polyethylene terephthalate film.

11. A card as set forth in claim 9 wherein said metal layer is a layer of nickel about 0.2 microns in thickness.

12. A card as set forth in claim 9 wherein said metal layer is a sputter coated nickel layer having a surface conductivity of about 20 ohms per square.

13. A card as set forth in claim 9 wherein said circuit layer comprises a plurality of spaced apart sites adapted to be read by an external reading device, each site including means capable of being irreversibly converted from a first readable state to a second readable state.

14. A memory card comprising:
   a flexible composite substrate having a thickness of approximately 12 mils, said composite substrate comprising a flexible base film formed of a biaxially oriented polyethylene film, a flexible thermoplastic polymer top film laminated to one surface of said base film, said top film comprising a biaxially oriented polyethylene terephthalate film having a thickness of about 1 to 2 mils, a polyurethane adhesive disposed between and bonding together said base film and said top film, a layer of sputter coated nickel having a thickness of less than 0.5 micron adhered to the exposed surface of said top film, a circuit layer overlying said nickel layer, said circuit layer including a plurality of inductive current measurable sites at spaced locations on the card, each site including a fusible link which can be irreversibly broken by application of an electrical current of sufficient magnitude to convert the site from a first state to a second state which can be read from the card by an external reader, and a protective layer overlying and protecting said circuit layer, said protective layer including printed indicia visible on the front of the card.

15. A flexible plastic substrate for forming a memory card, said substrate comprising a flexible base film formed from a biaxially oriented polyethylene film, a flexible thermoplastic polymer top film laminated to one surface of said base film, said top film comprising a biaxially oriented polyethylene terephthalate film having a thickness of about 1 to 2 mils, a polyurethane adhesive disposed between and bonding together said base film and said top film, and a layer of sputter coated nickel having a thickness of less than 0.5 micron adhered to the exposed surface of said top film.

16. A substrate as set forth in claim 15 wherein said substrate has a thickness of approximately 12 mils.

17. A method of forming a memory card comprising:

applying a thin layer of a metal to one surface of a polyester film;

laminating the opposite surface of said film to a thicker polyester film;

forming a circuit layer on said thin layer of conductive metal; and applying a protective layer over said circuit layer.

18. A method according to claim 17 wherein said step of applying a thin layer of a conductive metal to one surface of a polyester film comprises sputter coating a thin layer of nickel onto one surface of a polyester film of 1 to 2 mils thickness, and said step of laminating comprises laminating said opposite surface of said film to a thicker polyester film using a polyurethane adhesive.

19. A method of forming a memory card comprising sputter coating a layer of nickel of less than 0.5 micron onto one surface of a biaxially oriented polyethylene film of 1 to 2 mils thickness;

laminating the opposite surface of said film to a biaxially oriented polyethylene terephthalate film of 8 to 12 mils thickness;

forming on said thin layer of conductive metal a plurality of spaced apart sites adapted to be read by an external reading device, each site including means capable of being irreversibly converted from a first readable state to a second readable state; and applying a protective layer over said conductive layer.

* * * * *